United States Patent
Rosell et al.

(10) Patent No.: US 12,388,715 B2
(45) Date of Patent: Aug. 12, 2025

(54) METHOD AND SYSTEM FOR IDENTIFYING WHICH NETWORKED DEVICE IS MOUNTED AT A MOUNTING LOCATION

(71) Applicant: Axis AB, Lund (SE)

(72) Inventors: Magnus Rosell, Lund (SE); Daria Sharshakova, Lund (SE); Frida Johnsson, Lund (SE); Gillis Oldfeldt, Lund (SE); Mustafa Albayati, Lund (SE); Oliver Bergendorff, Lund (SE)

(73) Assignee: AXIS AB, Lund (SE)

( * ) Notice: Subject to any disclaimer, the term of this patent is extended or adjusted under 35 U.S.C. 154(b) by 204 days.

(21) Appl. No.: 18/464,314

(22) Filed: Sep. 11, 2023

(65) Prior Publication Data

US 2024/0129196 A1 Apr. 18, 2024

(30) Foreign Application Priority Data

Oct. 13, 2022 (EP) .................................. 22201260

(51) Int. Cl.
*H04L 41/12* (2022.01)
*H04R 1/40* (2006.01)
(Continued)

(52) U.S. Cl.
CPC ............. *H04L 41/12* (2013.01); *H04R 1/406* (2013.01); *H04R 3/005* (2013.01); *H04R 29/005* (2013.01)

(58) Field of Classification Search
CPC ..... H04L 41/12; H04L 41/0866; H04L 67/52; H04L 43/0811; H04L 2101/622; H04L 61/30; H04R 1/406; H04R 3/00; H04R 3/005; H04R 29/005; H04M 1/04; H04M 1/6016
See application file for complete search history.

(56) References Cited

U.S. PATENT DOCUMENTS

| 5,461,672 A * | 10/1995 | Enokido | ................. H04M 1/03 379/433.02 |
| 7,356,137 B1 * | 4/2008 | Burg | ................. H04M 3/42374 379/211.01 |

(Continued)

FOREIGN PATENT DOCUMENTS

| CN | 104320762 A | 1/2015 |
| EP | 1217611 A2 | 6/2002 |

(Continued)

*Primary Examiner* — Rasheed Gidado
(74) *Attorney, Agent, or Firm* — Volpe Koenig

(57) ABSTRACT

A system and a method of identifying which networked device of a set of networked devices is mounted at a first mounting location of mounting locations of the set of networked devices known in a management server are disclosed. Each networked device of the set of networked devices has a unique identifier. A predetermined sound is emitted using a loudspeaker of a portable device. Information specifying the first mounting location is further sent from the portable device to the management server. Upon detecting the predetermined sound using a microphone in a first networked device of the set of networked devices, the unique identifier of the first networked device is sent from the first networked device to the management server. At the management server, the unique identifier of the first networked device is then linked to the first mounting location.

11 Claims, 8 Drawing Sheets

(51) Int. Cl.
   *H04R 3/00*       (2006.01)
   *H04R 29/00*      (2006.01)

(56) References Cited

U.S. PATENT DOCUMENTS

| | | | |
|---|---|---|---|
| 9,324,244 B1 * | 4/2016 | Sol | G09B 5/08 |
| 2011/0191454 A1 | 8/2011 | Joukov | |
| 2015/0289070 A1 | 10/2015 | Armstrong-Muntner | |
| 2016/0309258 A1 | 10/2016 | Hiscock et al. | |
| 2019/0149946 A1 | 5/2019 | Kao | |
| 2019/0200133 A1 | 6/2019 | Hammer et al. | |

FOREIGN PATENT DOCUMENTS

| | | | |
|---|---|---|---|
| EP | 1217611 A3 | 2/2004 | |
| EP | 3182737 A1 | 6/2017 | |

\* cited by examiner

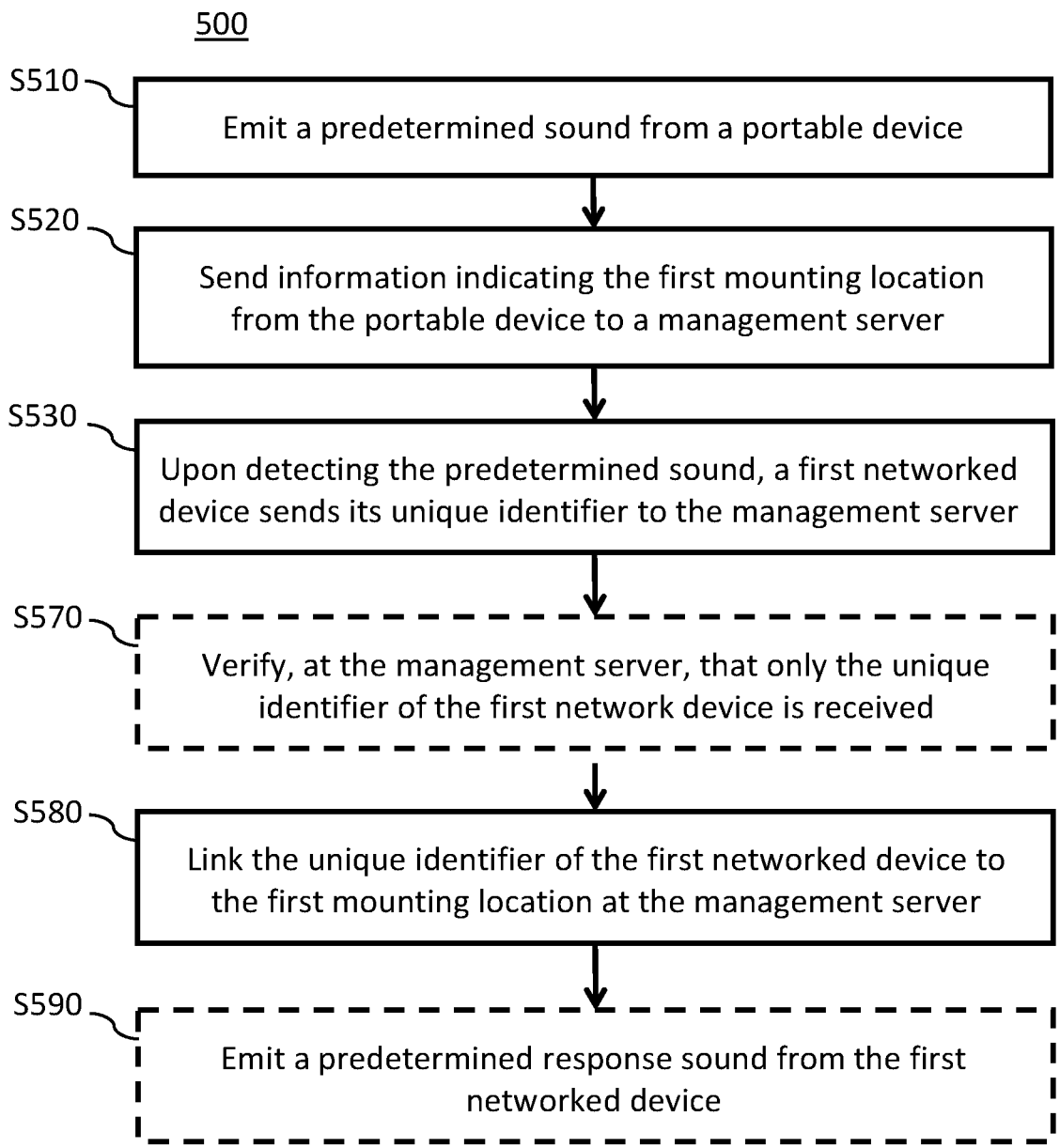

METHOD AND SYSTEM FOR IDENTIFYING WHICH NETWORKED DEVICE IS MOUNTED AT A MOUNTING LOCATION

TECHNICAL FIELD

The present invention relates to identifying which networked device of a set of networked devices is mounted at a mounting location of mounting locations of the set of networked devices.

BACKGROUND

In systems with a set of networked devices mounted at respective mounting locations, it may be advantageous to know which device is mounted where. Such networked devices may for example be networked loudspeakers, networked door stations or networked cameras. For example, when a set of networked loudspeakers are to be mounted in a building, such as a department store, it is typically desired to know which loudspeaker is mounted where, such that a targeted sound message can be emitted from a loudspeaker at a specific location. For example, a specific message may be intended to be transmitted from one or more loudspeakers mounted in a specific department of a department store. In a typical scenario, each networked device has a unique identifier, i.e. each networked device has an identifier which is unique to that device. The unique identifier may for example be a serial number or a MAC address. Furthermore, the mounting locations have been determined in advance and are known in a management server. After mounting, each networked device may communicate with the management server, e.g., through a network to which the mounted networked devices may connect. The management server may then receive the unique identifiers from the networked devices and hence know which networked devices are connected to the network but does not know which networked device is located at which mounting location unless such a link is made. In prior art, this is typically made by specifying which networked device is to be mounted at which location. However, such a procedure makes the mounting of the networked devices more cumbersome, since even if the networked devices may be identical except for the unique identifiers, the person mounting the networked devices must then make sure that the correct networked device is mounted at the correct location. Furthermore, there is always a risk that some network devices are not mounted in their intended mounting locations. This will be specifically acute when the number of networked devices is large. Further, in some scenarios, the person mounting may not be a person knowledgeable about the network devices other than how they should be physically mounted. The unique identifier may also not be accessible by ocular inspection but may require connection to the networked devices. Finally, if the networked devices have been mounted and it is noted that at least some of the networked devices have not been mounted in the intended mounting location, the mounting locations may be such that it is difficult to retrieve the unique identifier of the network devices.

Improvements in this context are thus desirable.

SUMMARY OF THE INVENTION

In view of the above, it is an object of the present inventive concept to mitigate, alleviate or eliminate one or more of the above-identified deficiencies and disadvantages in the art singly or in combination.

According to a first aspect, a method is provided of identifying which networked device of a set of networked devices is mounted at a first mounting location of mounting locations of the set of networked devices. Each networked device of the set of networked devices has a unique identifier, and the first mounting locations are known in a management server. A predetermined sound is emitted using a loudspeaker of a portable device, and the portable device sends information specifying the first mounting location to the management server. Upon detecting the predetermined sound using a microphone in a first networked device, the first networked device sends its unique identifier to the management server. At the management server, the unique identifier of the first networked device is linked to the first mounting location.

A networked device may be any type of device that is connected to a network such that it can communicate information within the network. Such networked devices may for example be loudspeakers, surveillance cameras, door stations etc.

A unique identifier may be any identifier that is unique to a network device.

By 'the mounting locations are known in a management system' is meant that the mounting locations as such are known in the management system, e.g., as locations on a map. However, it is not known in the management system which networked device is mounted at which mounting location.

The portable device does not have to be at any specific location when the predetermined sound is emitted from its loudspeaker. However, it is implicit from the fact that the predetermined sound is detected using a microphone in the first networked device that the portable device should be located such that the emitted predetermined sound can be detected using the microphone in the first networked device. Hence, it is implicit that the portable device is located within a distance from the first mounting location such that detection is enabled of the emitted predetermined sound by a microphone in a networked device mounted at the first mounting location.

By sending the information identifying the first mounting location to the management server and sending the unique identifier of the first networked device detecting the predetermined sound, it can be derived that the first networked device is mounted at the first mounting location. Hence, deriving which networked device is mounted at a first mounting location is made possible in a system after mounting of the networked device at the first mounting location. This is further possible without the need for physical or electronic connection to the networked device. It is further possible when the networked device is mounted such that all or part of any visual indication on the networked device of its unique identifier is obscured.

The first networked device may further, upon detecting the predetermined sound, emit a predetermined response sound using a loudspeaker in the first networked device.

By emitting the predetermined response sound, a user of the portable device can verify that the predetermined response sound is emitted from a networked device mounted at the first mounting location.

In scenarios when the set of networked devices are mounted at mounting locations such that the predetermined sound may be detected using a microphone in both a first networked device and a second networked device, the portable device, when the predetermined sound is emitted, should be located at a location that is closer to the first mounting location than to all other mounting locations of the set of networked devices.

Hence, in embodiments, the predetermined sound comprises a first frequency and a second frequency and the portable device, when the predetermined sound is emitted, is located at a location that is closer to the first mounting location than to all other mounting locations of the set of networked devices. A first ratio between the amplitude at the first frequency and the amplitude at the second frequency of the detected predetermined sound in the first networked device may then be obtained. Upon detecting the predetermined sound using a microphone in a second networked device, the unique identifier of the second networked device is sent from the second networked device to the management server. A second ratio between the amplitude at the first frequency and the amplitude at the second frequency of the detected predetermined sound in the second networked device may then be obtained. It is then determined at the management server which networked device of the first networked device and the second networked device that is closest to the portable device. The determining is based on the first ratio and the second ratio. At the management server, the unique identifier of the networked device determined to be closest to the portable device is then linked to the first mounting location.

By emitting two frequencies, a relative distance to the portable device can be determined for the first networked device and the second networked device, respectively based on the first ratio and the second ratio. This is possible since the amplitude of the higher of the first frequency and the second frequency will be attenuated more over a distance than the lower of the first frequency and the second frequency. Hence, since the portable device is located closest to the first mounting location when the predetermined sound is emitted, the networked device that is closest to the portable device will also be closest to the first mounting location. Hence, deriving which networked device is mounted at a first mounting location is made possible in a system after mounting of the networked device at the first mounting location also if the set of networked devices are mounted at mounting locations such that the predetermined sound emitted when the portable device is located at one location can be detected by two or more networked devices mounted in different mounting locations.

The first ratio and the second ratio may be determined at the first networked device. The first ratio and the second ratio are then sent from the first networked device and the second networked device, respectively, to the management server. The obtaining of the first ratio and the second ratio at the management server then comprises receiving the first ratio and the second ratio to the management server from the first networked device and the second networked device, respectively.

In alternative, the first ratio and the second ratio may be determined at the management server. This further requires sending a representation of the detected predetermined sound from the first networked device to the management server and sending a representation of the detected predetermined sound from the second networked device to the management server. The obtaining of the first ratio and the second ratio at the management server then comprises determining the first ratio and the second ratio.

According to a second aspect, a system for identifying which networked device of a set of networked devices is mounted at a respective mounting location of mounting locations of the set of networked devices is provided. The system comprises a portable device comprising a loudspeaker, a management server comprising a memory storing the mounting locations of the set of networked devices, and the set of networked devices mounted at the mounting locations and each comprising a microphone. The portable device further comprises circuitry configured to execute an emitting function configured to emit a predetermined sound using the loudspeaker of the portable device, and a sending function configured to send information specifying a mounting location of the mounting locations of the set of networked devices to the management server. Each networked device of the set of networked devices further comprises circuitry configured to execute an identifier sending function configured to, upon detecting the predetermined sound using the microphone, sending its unique identifier to the management server. The management server further comprises circuitry configured to execute a linking function configured to link the unique identifier to the mounting location.

The above-mentioned optional additional features of the method according to the first aspect, when applicable, apply to the system according to the third aspect as well. In order to avoid undue repetition, reference is made to the above.

According to a third aspect, a non-transitory computer-readable storage medium is provided having stored thereon instructions for implementing the method according to the first aspect when executed by a system according to the second aspect.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or acts of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended figures. The figures should not be considered limiting but are instead used for explaining and understanding.

FIG. 5 shows a flow chart in relation to embodiments of a method of identifying which networked device of a set of networked devices is mounted at a respective mounting location of mounting locations of the set of networked devices.

DETAILED DESCRIPTION

The present invention will now be described hereinafter with reference to the accompanying drawings, in which currently preferred embodiments of the invention are illustrated. This invention may, however, be embodied in many different forms and should not be construed as limited to the embodiments set forth herein.

The invention is applicable in any scenario where it is to be determined which of a set of networked devices having respective unique identifiers is mounted in a first mounting location of mounting locations known in a management server.

For example, the invention is applicable in scenarios in which a set of networked devices should be mounted at a respective mounting location of mounting locations, wherein each networked device has a unique identifier, i.e. each networked device has an identifier which is unique to that device. The networked devices may example be networked loudspeakers or networked cameras or any other networked device having a unique identifier. The unique identifier may for example be a serial number or a MAC address. The mounting locations have been determined in advance and are known in a management server, e.g., on a map of the area or premises where the networked devices should be mounted. After mounting, each networked device may communicate with the management server, e.g., through a network to which the mounted networked devices may connect and to which the management server is also connected. The management server may then receive the unique identifiers from the networked devices and hence know which networked devices are connected to the network. However, the management server does not know which networked device is located at which mounting location unless such a link is made.

In another example, the invention is also applicable when the set of networked devices have been mounted at the mounting locations according to a map known to the management server, wherein the unique identifier of each networked device is linked in advance to a respective mounting location of the mounting locations but where it has been identified after mounting that at least some networked devices have been mounted at the wrong mounting location in relation to the indication on the map. Hence, in this scenario, the person mounting the networked devices should have identified the unique identifier of each networked device of the set of networked devices and mounted them in a respective mounting location according to the link on the map known to the management server but in at least some occasions failed to mount the correct networked device at the correct mounting location.

Figure 1:
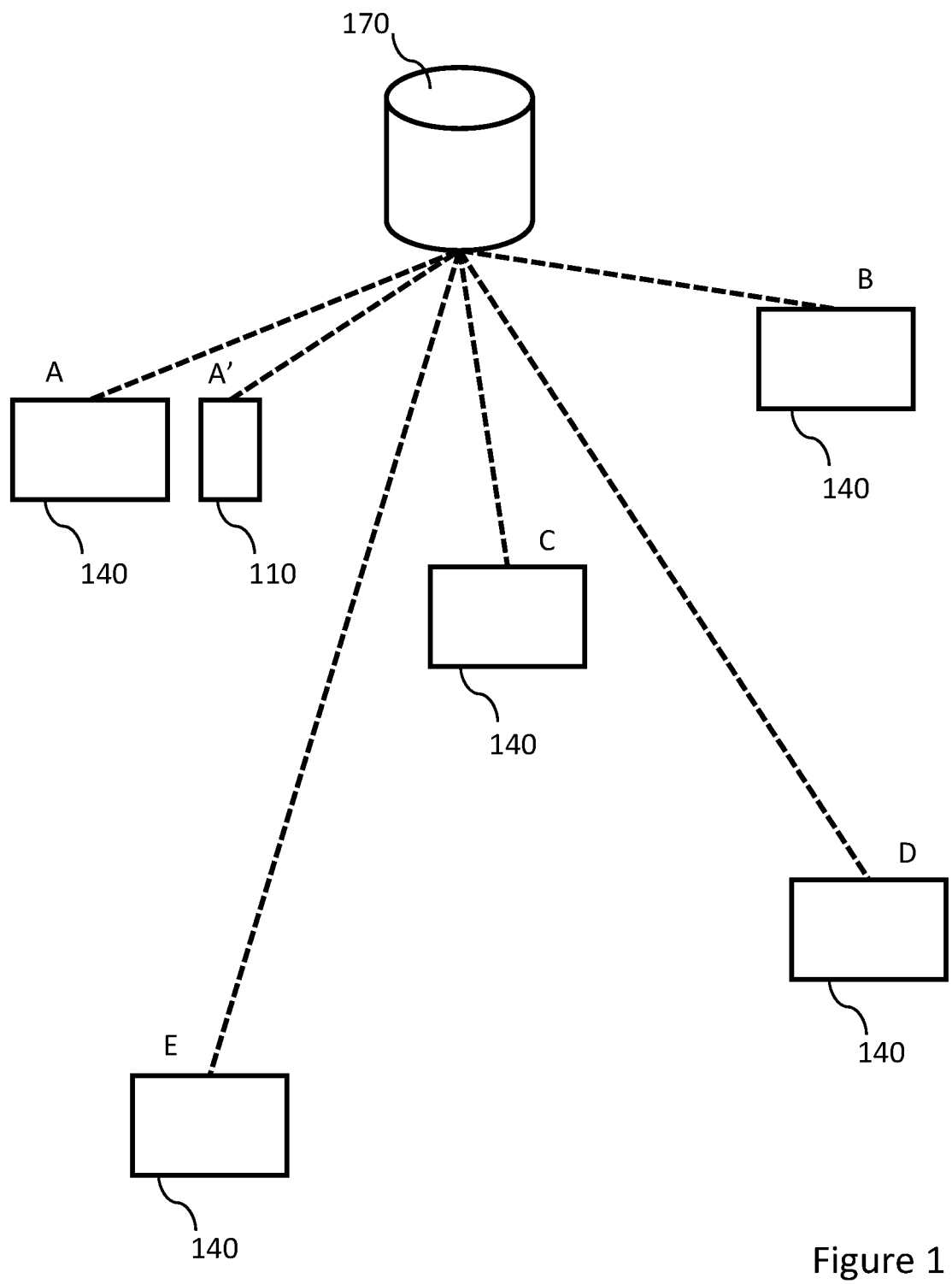
FIG. 1 shows a system for identifying which networked device of a set of networked devices is mounted at a respective mounting location of mounting locations of the set of networked devices.

A system 100 for identifying which networked device 140 of a set of networked devices 140 is mounted at a respective mounting location of mounting locations A-E of the set of networked devices 140 will now be described in relation to FIGS. 1-4. As shown in FIG. 1, the system 100 comprises a portable device 110, the set of networked devices 140, and a management server 170.

Figure 2:
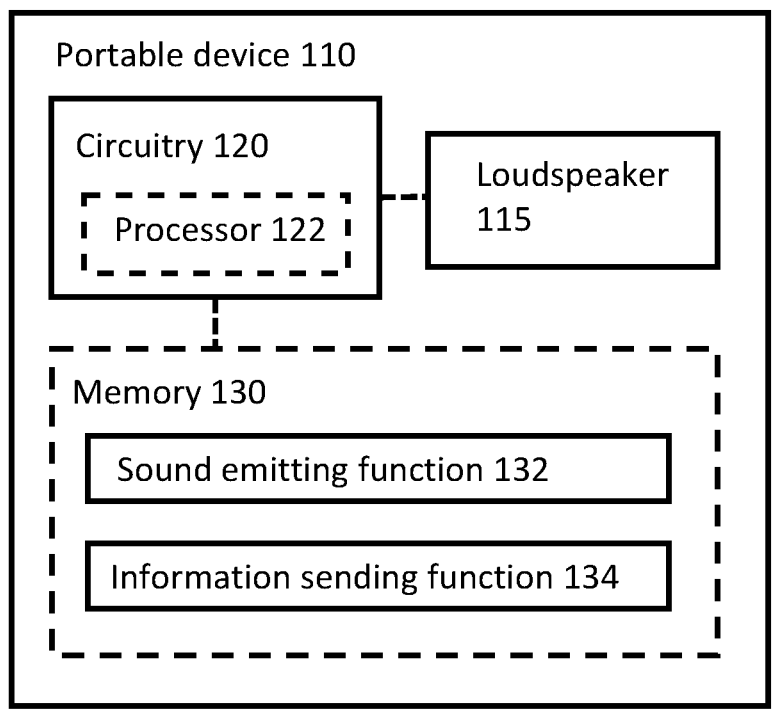
FIG. 2 shows a portable device of in the system of FIG. 1.

FIG. 2 shows a portable device 110 of the system 100 of FIG. 1. The portable device 110 may for example be a mobile phone, tablet, or laptop.

The portable device 110 comprises a loudspeaker 115 and a circuitry 120. The circuitry 120 is configured to carry out functions of the portable device 110. The circuitry 120 may include a processor 122, such as for example a central processing unit (CPU), graphical processing unit (GPU), tensor processing unit (TPU), microcontroller, or microprocessor. The processor 122 is configured to execute program code. The program code may for example be configured to carry out the functions of the portable device 110.

The portable device 110 may further comprise a memory 130. The memory 130 may be one or more of a buffer, a flash memory, a hard drive, a removable media, a volatile memory, a non-volatile memory, a random access memory (RAM), or another suitable device. In a typical arrangement, the memory 130 may include a non-volatile memory for long term data storage and a volatile memory that functions as device memory for the circuitry 120. The memory 130 may exchange data with the circuitry 120 over a data bus. Accompanying control lines and an address bus between the memory 130 and the circuitry 120 also may be present.

Functions of the portable device 110 may be embodied in the form of executable logic routines (e.g., lines of code, software programs, etc.) that are stored on a non-transitory computer readable medium (e.g., the memory 130) of the portable device 110 and are executed by the circuitry 120 (e.g., using the processor 132). Furthermore, the functions of the portable device 110 may be a stand-alone software application or form a part of a software application that carries out additional tasks related to the portable device 110. The described functions may be considered a method that a processing unit, e.g., the processor 132 of the circuitry 120 is configured to carry out. Also, while the described functions may be implemented in software, such functionality may as well be carried out via dedicated hardware or firmware, or some combination of hardware, firmware and/or software.

The loudspeaker 115 is configured to emit a predetermined sound. In embodiments, the loudspeaker is configured to emit a sound including two frequencies. The two frequencies can be emitted in parallel or sequentially. Further description of the emitted predetermined sound which the loudspeaker 115 is configured to emit in different embodiments is provided in the description hereinafter in relation to FIG. 5 and FIGS. 6A-C.

The circuitry 120 is configured to execute a sound emitting function 132 configured to emit a predetermined sound using the loudspeaker 115. The circuitry 120 is further configured to execute an information sending function 134 configured to send information specifying a mounting location to the management server 170. Specifically, the mounting location for which it is to be determined which networked device 140 is mounted at is indicated.

Further description of the acts performed by the functions of the portable device 110 in different embodiments is provided in the description hereinafter in relation to FIG. 5 and FIGS. 6A-C.

Figure 3:
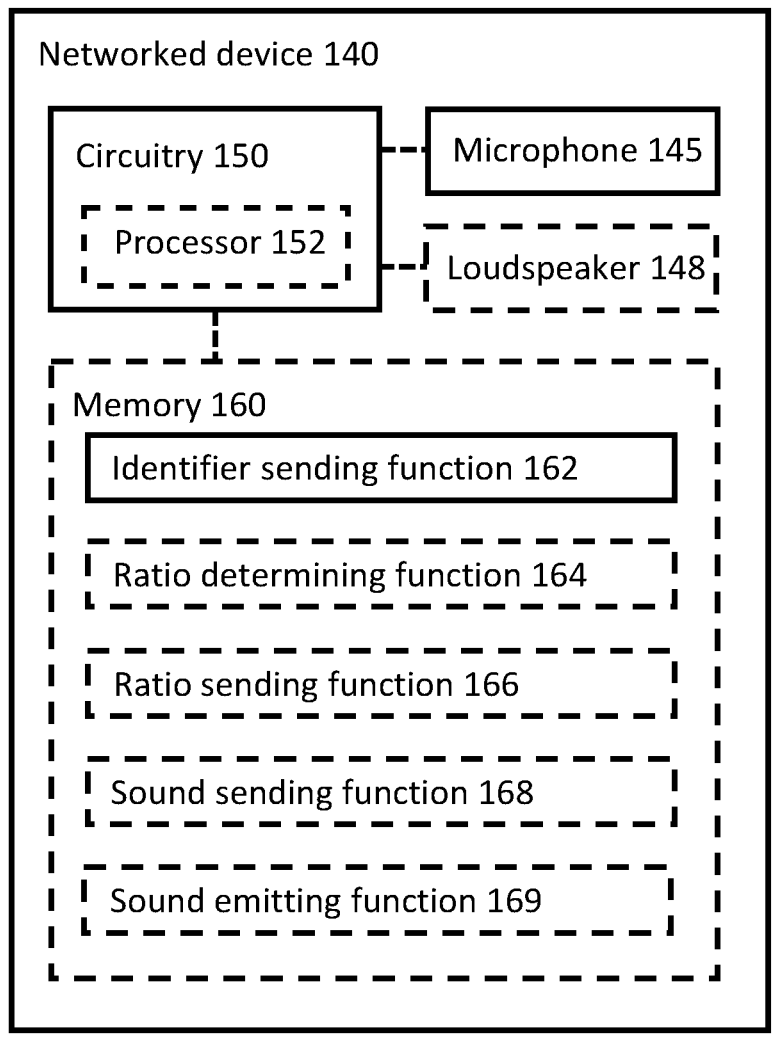
FIG. 3 shows a networked device of the system of FIG. 1.

FIG. 3 shows a networked device 140 of the system 100 of FIG. 1. The networked device 140 has a unique identifier. The networked device 140 may for example be a networked loudspeaker, a networked camera, or a networked door station.

The networked device 140 comprises a microphone 145 and a circuitry 150. The circuitry 150 is configured to carry out functions of the networked device 140. The circuitry 150 may include a processor 152, such as for example a central processing unit (CPU), graphical processing unit (GPU), tensor processing unit (TPU), microcontroller, or microprocessor. The processor 152 is configured to execute program code. The program code may for example be configured to carry out the functions of the networked device 140.

The networked device 140 may further comprise a memory 160. The memory 160 may be one or more of a buffer, a flash memory, a hard drive, a removable media, a volatile memory, a non-volatile memory, a random access memory (RAM), or another suitable device. In a typical arrangement, the memory 160 may include a non-volatile memory for long term data storage and a volatile memory that functions as device memory for the circuitry 150. The memory 160 may exchange data with the circuitry 150 over a data bus. Accompanying control lines and an address bus between the memory 160 and the circuitry 150 also may be present.

Functions of the networked device 140 may be embodied in the form of executable logic routines (e.g., lines of code, software programs, etc.) that are stored on a non-transitory computer readable medium (e.g., the memory 160) of the networked device 140 and are executed by the circuitry 150 (e.g., using the processor 152). Furthermore, the functions of the networked device 140 may be a stand-alone software application or form a part of a software application that carries out additional tasks related to the networked device 140. The described functions may be considered a method that a processing unit, e.g., the processor 152 of the circuitry 150 is configured to carry out. Also, while the described functions may be implemented in software, such functionality may as well be carried out via dedicated hardware or firmware, or some combination of hardware, firmware and/or software.

The microphone 145 is configured to detect the predetermined sound.

The circuitry 150 is configured to execute an identifier sending function configured to, upon detecting the predetermined sound emitted by the loudspeaker 115 of the portable device 162, send the unique identifier of the networked device 140 to the management server 170.

In embodiments when the loudspeaker 115 of the portable device 110 is configured to emit a predetermined sound including a first frequency and a second frequency, the circuitry 150 may further be configured to execute a ratio determining function 164 configured to, upon detecting the predetermined sound using the microphone 145, determine the ratio between the amplitude at the first frequency and the amplitude at the second frequency of the predetermined sound as detected by the microphone 155. The circuitry is then further configured to execute a ratio sending function 166 configured to send the ratio to the management server 170.

Alternatively, in embodiments when the loudspeaker 115 of the portable device 110 is configured to emit a predetermined sound including a first frequency and a second frequency, the circuitry 150 may further be configured to execute a sound sending function 168 configured to, upon detecting the predetermined sound using the microphone 145, send a representation of the detected predetermined sound to the management server 170.

Additionally, the circuitry 150 may further be configured to execute a sound emitting function 169 configured to, upon detecting the predetermined sound emitted by the loudspeaker 115 of the portable device 110, emit a predetermined response sound using a loudspeaker 148.

Further description of the acts performed by the functions of the networked device 140 in different embodiments is provided in the description hereinafter in relation to FIG. 5 and FIGS. 6A-C.

Figure 4:
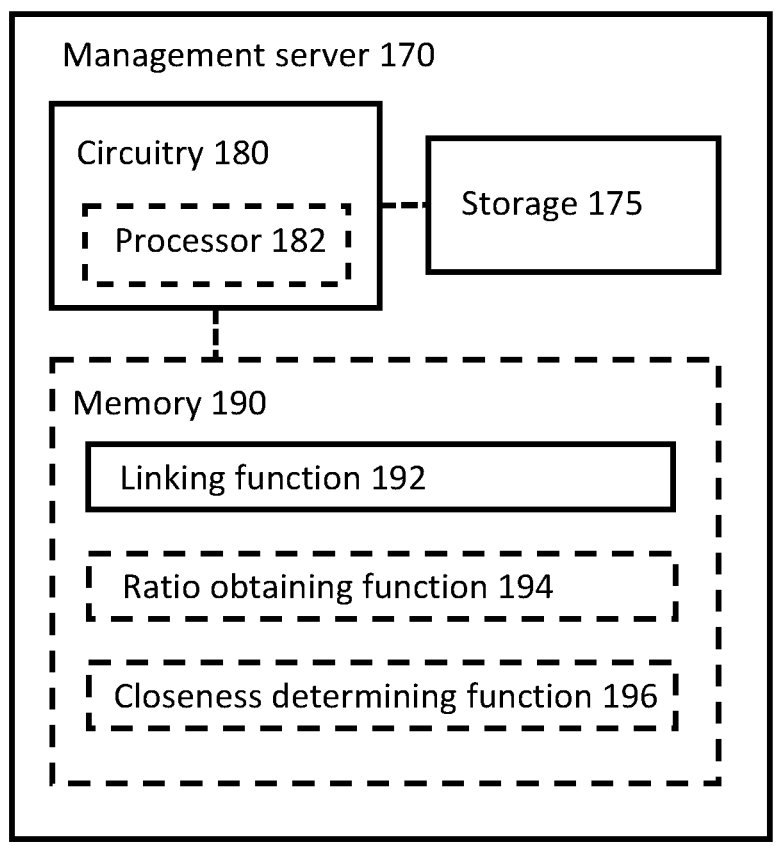
FIG. 4 shows a management server of the system of FIG. 1.

FIG. 4 shows a management server 170 of the system 100 of FIG. 1. The management server 170 may be implemented in a separate device from the portable device 140, e.g., as a separate computer or computer system connected to the network to which the networked devices are connected to or are to be connected to. In alternative, the management server may be implemented in the portable device 140.

If the management server 170 is implemented as a separate device from the portable device 14, it comprises a storage 175 and a circuitry 180. The circuitry 180 is configured to carry out functions of the management server 170. The circuitry 180 may include a processor 182, such as for example a central processing unit (CPU), graphical processing unit (GPU), tensor processing unit (TPU), microcontroller, or microprocessor. The processor 182 is configured to execute program code. The program code may for example be configured to carry out the functions of the management server 170.

The management server 170 may further comprise a memory 190. The memory 190 may be one or more of a buffer, a flash memory, a hard drive, a removable media, a volatile memory, a non-volatile memory, a random access memory (RAM), or another suitable device. In a typical arrangement, the memory 190 may include a non-volatile memory for long term data storage and a volatile memory that functions as device memory for the circuitry 180. The memory 190 may exchange data with the circuitry 180 over a data bus. Accompanying control lines and an address bus between the memory 190 and the circuitry 180 also may be present.

Functions of the management server 170 may be embodied in the form of executable logic routines (e.g., lines of code, software programs, etc.) that are stored on a non-transitory computer readable medium (e.g., the memory 190) of the management server 170 and are executed by the circuitry 180 (e.g., using the processor 182). Furthermore, the functions of the management server 170 may be a stand-alone software application or form a part of a software application that carries out additional tasks related to the management server 170. The described functions may be considered a method that a processing unit, e.g., the processor 182 of the circuitry 180 is configured to carry out. Also, while the described functions may be implemented in software, such functionality may as well be carried out via dedicated hardware or firmware, or some combination of hardware, firmware and/or software.

The storage 175 is configured to store the mounting locations and links between unique identifiers of network devices and respective mounting locations. The storage 175 may further be configured to store a map and an indication of the mounting locations on the map.

The circuitry 180 is configured to execute a linking function 192 configured to link the unique identifier received from the networking device 140 to the mounting location.

In embodiments, the loudspeaker 115 of the portable device 110 is configured to emit a predetermined sound including a first frequency and a second frequency, and the portable device, when the predetermined sound is emitted, is placed at a location that is closer to one mounting location than to all other mounting locations of the set of networked devices. For example, if it is to be determined which network device 140 is mounted at a first mounting location A in FIG. 1, the portable device is placed at a location A' which is closer to the first mounting location A than to all other mounting locations B-E. In such embodiments, the circuitry 180 may further be configured to execute a ratio obtaining function 194 configured to obtain a respective ratio between the amplitude at the first frequency and the amplitude at the second frequency of the detected predetermined sound in each networked device. The circuitry 180 is then further configured to execute a closeness determining function 196 configured to determine which networked device of the networked devices that is closest to the portable device based on the determined respective ratios. If the respective ratios are received from two or more networked devices 140, the ratio obtaining function 194 may be configured to receive the respective ratios. In alternative, if a representation of the detected sound is received from two or more network devices 140, the ratio obtaining function 194 may be configured to determine the respective ratios for the two or more network devices 140. The linking function 192 is then configured to link the unique identifier of the networked device determined to be closest to the portable device 170 to the first mounting location A.

If the management server 170 is implemented in the portable device 140, the portable device 140 will further comprise the storage 175. Furthermore, the circuitry 150 of the portable device 140 will further be configured to carry out the functions of the management server 170, i.e. the linking function 192, and optionally the ratio obtaining function 194, and the closeness determining function 196.

Embodiments of a method of identifying which networked device of a set of networked devices is mounted at a first mounting location will now be described in relation to FIG. 5 and FIGS. 6A-C.

In FIG. 5, a flow chart in relation to embodiments of a method 500 for identifying which network device of a set of networked devices is mounted at a first mounting location is shown. The method 500 may for example be performed in the system 100 as described in relation to FIG. 1-4. Each networked device of the set of networked devices has a unique identifier and may for example be a networked device 140 as described in relation to FIG. 3 and is performed using a portable device, such as the portable device described in relation to FIG. 2. The mounting locations of the set of networked devices are known in a management server, such as the management server 170 as described in relation to FIG. 4. As described in relation to FIG. 4, the management server may be implemented in a separate device from the portable device, or the management server may be implemented in the portable device. Hence, in the following when referring to the management device, both of these options are encompassed.

The method 500 is performed in relation to a first mounting location of the mounting locations of the set of networked devices in order to determine which network device of the set of network devices is mounted in the first mounting location. The method 500 may then be repeated for a portion or all of the rest of the mounting locations of the remaining network devices of the set of network devices.

First, a predetermined sound is emitted S510 using a loudspeaker of the portable device. The predetermined sound is emitted S510 whilst the portable device is located such that a microphone of a network device mounted at the first mounting location can detect the predetermined sound. The portable device further sends S520 information specifying the first mounting location to the management server. The information may for example be sent upon a user of the portable device selecting the first mounting location on a map in the portable device. Upon detecting the predetermined sound using a microphone in a first networked device, the first networked device sends S530 its unique identifier to the management server. At the management server, the unique identifier of the first networked device is then linked S580 to the first mounting location.

The method 500 may further include the first networked device emitting S590 a predetermined response sound upon detecting the predetermined sound. In such a way, an operator may verify that the first network device has detected the emitted predetermined sound and verify that the response sound emitted from the first networked device comes from the first mounting location for which the method 500 is being performed.

The method 500 is applicable in scenarios when only the first network device and no other network device of the set of network devices detects the emitted predetermined sound. This may for example be scenarios when the networked devices are sparsely distributed such that only one network device at a time are within a distance from the portable device to detect the emitted predetermined sound.

In scenarios when more than one network device can detect the emitted predetermined sound, the method may further comprise verifying S570, at the management server, that only the unique identifier of the first network device is received before linking S580 the unique identifier of the first network device to the first mounting location. In case the management server receives a unique identifier by a further network device, it may prompt a move of the portable device closer to the first mounting location, and/or a reduction of the amplitude of the predetermined sound, before a reiteration of the method 500 is performed in relation to the first mounting location. Additionally, or alternatively, a user of the portable device, may detect when a predetermined response sound is emitted from more than one network device. The portable device may then be moved closer to the first mounting location, and/or the amplitude of the predetermined sound may be reduced, before a reiteration of the method 500 in relation to the first mounting location is performed. Additionally, or alternatively, the portable device may, whilst the predetermined sound is emitted S520, be placed at a location such that the emitted sound cannot be detected by a microphone of a network device mounted at a mounting location other than the first mounting location in relation to which the method 500 is being performed.

In addition to linking S580 the unique identifier of the first networked device to the first mounting location, the first networked device may be provided with a name, such as a name indicating the location where it is mounted. For example, if the first networked device is mounted in a building, the networked device may be given a name that indicates the part of the building that the first networked device is mounted.

Turning now to FIG. 6, in which a flow chart in relation to further embodiments of a method 500 for identifying which network device of a set of networked devices is mounted at a first mounting location is shown.

The method 600 may for example be performed in the system 100 as described in relation to FIG. 1-4. Each networked device of the set of networked devices has a unique identifier and may for example be a networked device 140 as described in relation to FIG. 3 and is performed using a portable device, such as the portable device described in relation to FIG. 2. The mounting locations of the set of networked devices are known in a management server, such as the management server 170 as described in relation to FIG. 4. As described in relation to FIG. 4, the management server may be implemented in a separate device from the portable device, or the management server may be implemented in the portable device. Hence, in the following when referring to the management device, both of these options are encompassed.

The method 600 is applicable in scenarios where the set of network devices are mounted at mounting locations such that more than one network device will typically detect an emitted predetermined sound from a portable device. To this end, when the method 600 is performed in relation to the first mounting location, the portable device is located S605 at a location that is closer to the first mounting location than to all other mounting locations of the set of networked devices. A predetermined sound is then emitted S610. The predetermined sound includes two different frequencies, namely a first frequency and a second frequency. A reason for why two different frequencies are emitted is that over the same distance, the amplitude of a higher frequency sound will be attenuated more than the amplitude of a lower frequency sound. The first frequency and the second frequency may be emitted simultaneously, in sequence, or a combination of both. Furthermore, the first frequency and the second frequency portion of the predetermined sound may be of any type such as for example sinusoidal sound.

The portable device further sends S620 information indicating the first mounting location in relation to which the method 600 is being performed.

The emitted predetermined sound is then detected using a microphone in a first networked device. This means that the first networked device is mounted at a mounting location that is within a distance from the portable device such that the emitted predetermined sound can be detected by the microphone of the first networked device. Upon detecting the emitted predetermined sound, the first networked device sends S630 its unique identifier to the management server.

Similarly, the emitted predetermined sound is detected using a microphone in a second networked device. This means that also the second networked device is mounted at a mounting location that is within a distance from the portable device such that the emitted predetermined sound can be detected by the microphone of the second networked device. Upon detecting the emitted predetermined sound, the first networked device sends S635 its unique identifier to the management server.

At this stage it is not possible to determine which of the first network device and the second networked device is mounted at the first mounting location in relation to which the method 600 is performed. However, if no microphone in any of the further network devices of the set of network devices detects the emitted predetermined sound, one of the first network device and the second network device is mounted in the first mounting location in relation to which the method 600 is performed.

In order to determine which of the first network device and the second network device is mounted in the first mounting location in relation to which the method 600 is performed, a first ratio between the amplitude of the first frequency of the detected predetermined sound at the first network device and the amplitude of the second frequency of the detected predetermined sound at the first network device is obtained S660 at the management server. Similarly, a second ratio between the amplitude of the first frequency of the detected predetermined sound at the second network device and the amplitude of the second frequency of the detected predetermined sound at the second network device is obtained S662 at the management server. By comparing these ratios, it can be determined which of the first network device and the second network device is closer to the location where the portable device was located when the predetermined sound was emitted. Specifically, if the first frequency is a higher frequency and the second frequency is a lower frequency, the network device that is closest to the location where the portable device was located when the predetermined sound was emitted will have the highest ratio. If the first frequency is a lower frequency and the second frequency is a higher frequency, the network device that is closest to the location where the portable device was located when the predetermined sound was emitted will have the lowest ratio.

After obtaining the first ratio and the second ratio, it is determined S664 at the management server which network device of the first network device and the second network device that is closest to the portable device, or rather closest to the location of the portable device when the predetermined sound was emitted. Finally, since the portable device was located at a location closer to the first mounting location than to all other mounting locations of the set of networked devices when the predetermined sound was emitted, the networked device determined to be closest to the portable device, will also be the networked device that is closest to the first mounting location. Hence, the unique identifier of the networked device of the first networked device and the second networked device that is determined to be closest to the portable device is linked S680 to the first mounting location at the management server.

The networked device that is closest to the first mounting location and whose unique identifier is linked to the first mounting location may then be prompted, e.g., by the management server, to emit a predetermined response sound. In such a way, an operator may verify that the predetermined response sound comes from the first mounting location for which the method 600 is being performed.

The first ratio and the second ratio may either be determined at the first networked device and the second networked device, respectively, or they may be determined at the management server. In the following description of embodiments relating to the two alternatives are described in relation to FIG. 6B and FIG. 6C, respectively.

Figure 6A:
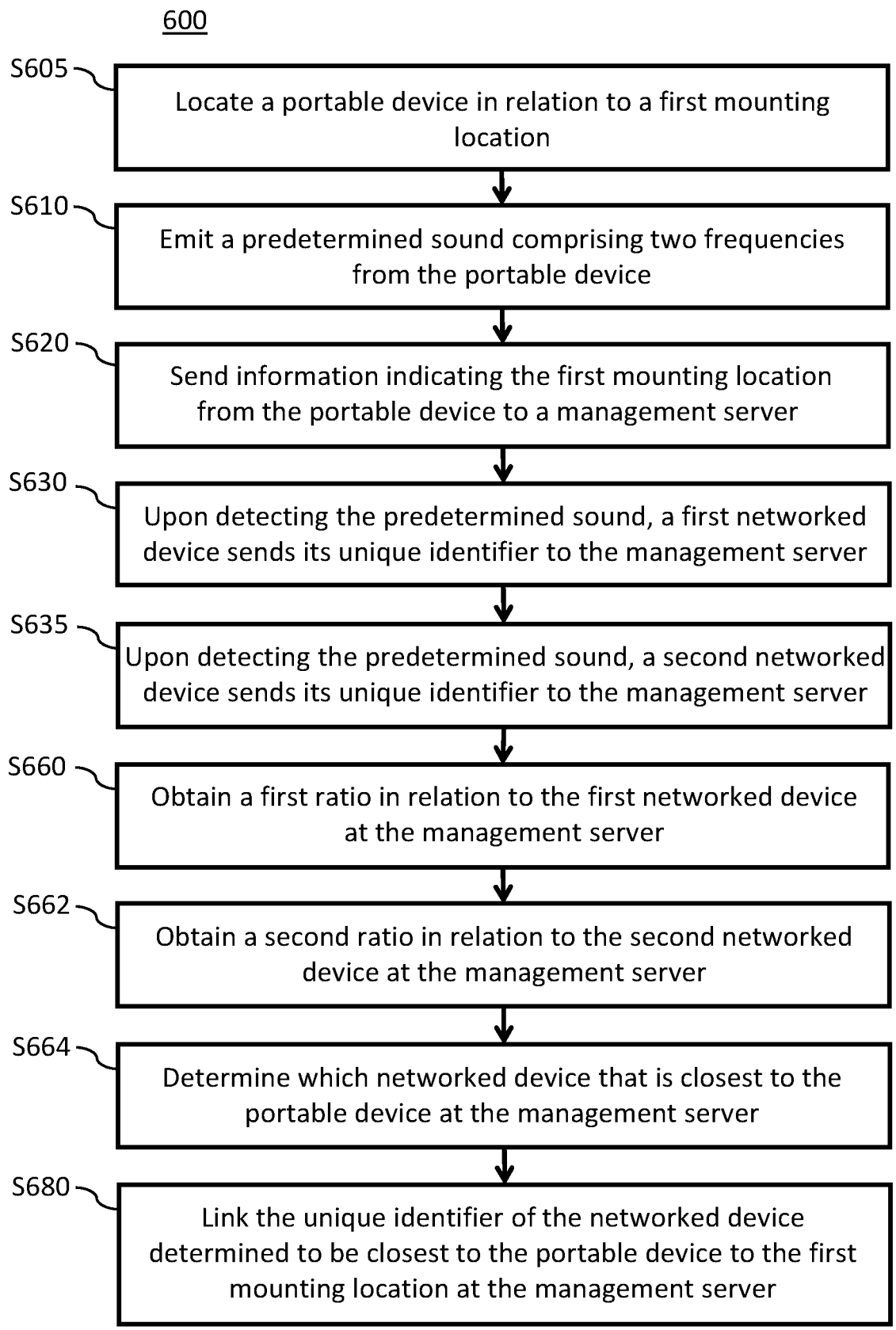
FIGS. 6A-C show flow charts in relation to further embodiments of a method of identifying which networked device of a set of networked devices is mounted at a respective mounting location of mounting locations of the set of networked devices.
Figure 6B:
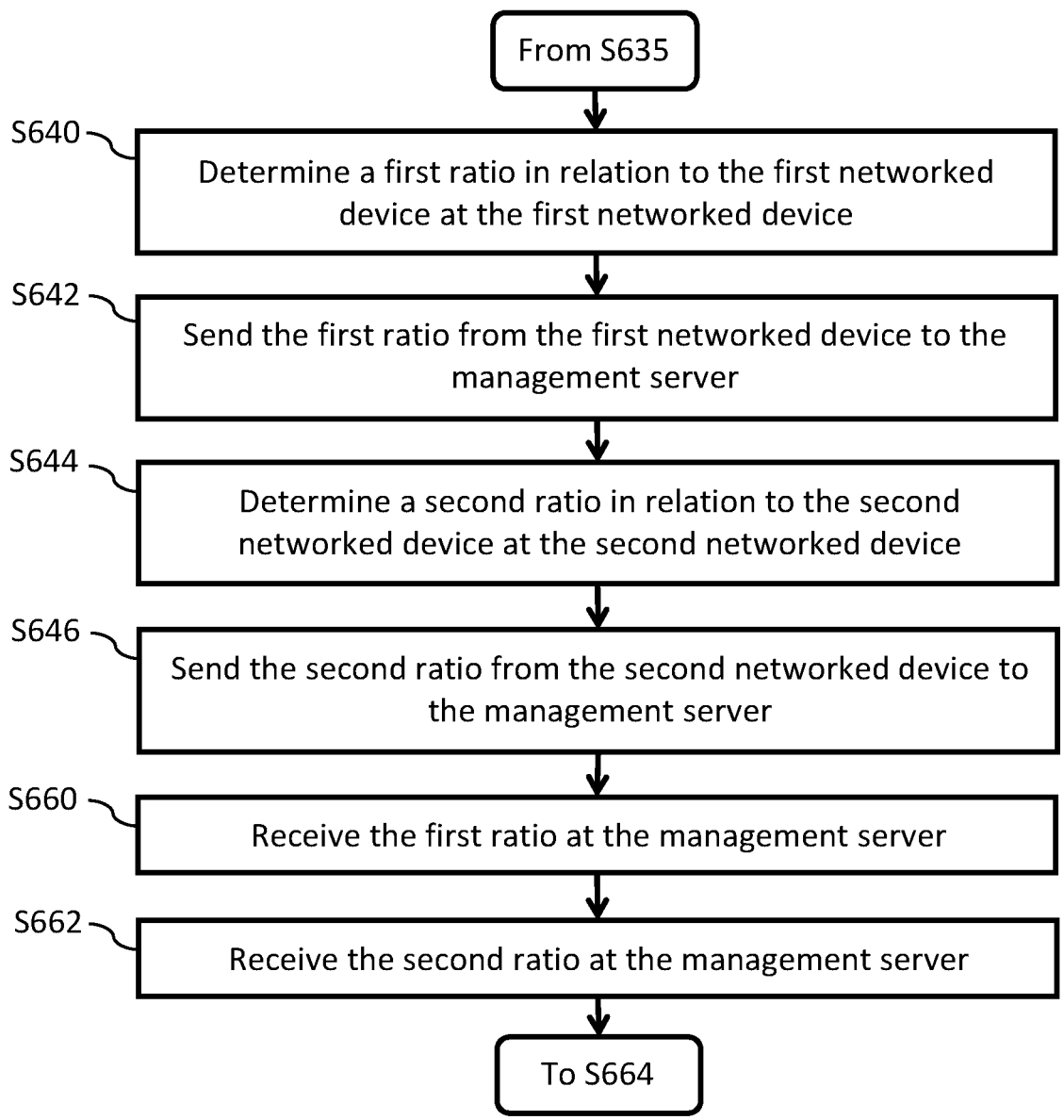

Turning to FIG. 6B, which discloses steps performed after the emitted predetermined sound has been detected in the first networked device and in the second networked device when the first ratio and the second ratio is determined in the first networked device and the second networked device, respectively.

A first ratio between the amplitude of the first frequency of the detected predetermined sound at the first network device and the amplitude of the second frequency of the detected predetermined sound at the first network device is determined S640 at the first networked device. The first ratio is then sent S642 from the first networked device to the management server.

Similarly, a second ratio between the amplitude of the first frequency of the detected predetermined sound at the second network device and the amplitude of the second frequency of the detected predetermined sound at the second network device is determined S644 at the second networked device. The first ratio is then sent S646 from the first networked device to the management server.

Obtaining S660 the first ratio at the management server then comprises receiving S660 the first ratio at the management server.

Similarly, obtaining S662 the second ratio at the management server then comprises receiving S662 the second ratio at the management server.

Figure 6C:
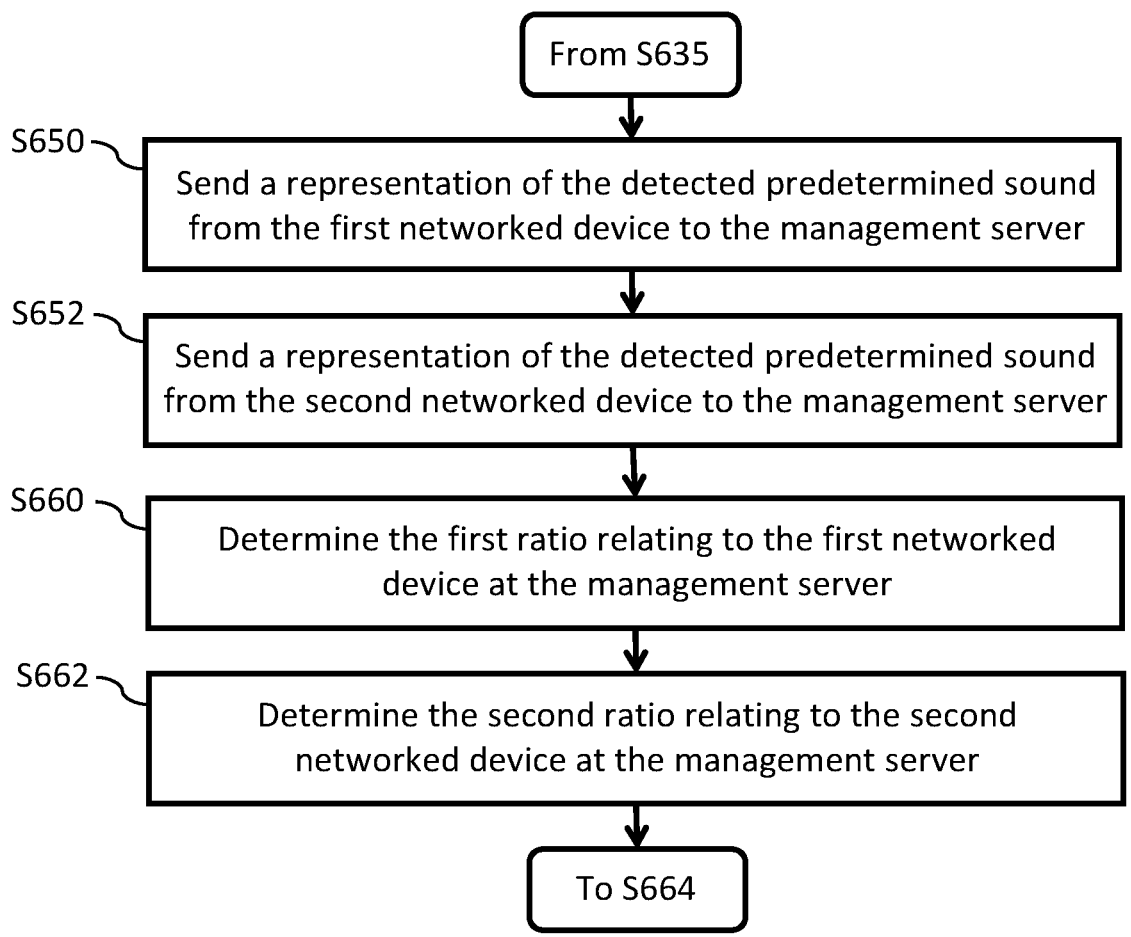

Turning to FIG. 6C, which discloses steps performed after the emitted predetermined sound has been detected in the first networked device and in the second networked device when the first ratio and the second ratio is determined in the management server.

A representation of the detected predetermined sound at the first networked device is sent S650 from the first networked device to the management server.

Obtaining S660 the first ratio at the management server then comprises determining S660 the first ratio between the amplitude of the first frequency of the detected predetermined sound at the first network device and the amplitude of the second frequency of the detected predetermined sound at the management server.

Similarly, a representation of the detected predetermined sound at the second networked device is sent S652 from the second networked device to the management server.

Obtaining S662 the second ratio at the management server then comprises determining S662 the second ratio between the amplitude of the first frequency of the detected predetermined sound at the first network device and the amplitude of the second frequency of the detected predetermined sound at the management server.

The steps of the method described above in relation to FIG. 5 and FIGS. 6A-C, respectively, may in different variants be performed in different parts of the system 100 and with varying degrees of automation. Examples of such variants are described in the following.

For instance, when the networked device detects the predetermined sound, the networked device may automatically send its unique identifier to the server. The networked device may alternatively inform the server that it has detected the predetermined sound and the server may link this information to an already registered unique identifier of the networked device, or the server may request the unique identifier once the networked device has signalled that it detected the predetermined sound.

In other variants, if the portable device has a network connection to the networked device, the networked device may send its unique identifier to the portable device, rather than directly to the server. If two or more networked devices detect the predetermined sound, they may each send their respective unique identifier to the portable device. The portable device may also receive representations of the detected sound, such that the portable device may perform the process of determining which networked device is closest. Once it has been determined which networked device is closest, the portable device may instruct the server to link the unique identifier of that networked device to the first mounting location.

If just one networked device detects the predetermined sound and informs the server, the server may automatically link the unique identifier of that networked device to the first mounting location. Alternatively, the server may prompt an installer or user to confirm that the identified networked device should be linked to the first mounting location. If two or more networked devices detect the predetermined sound, it may be determined as described above which of these is closest to the portable device emitting the predetermined sound. The server may automatically link the one that is determined to be the closest one to the first mounting location. Alternatively, a list of the networked devices that detected the predetermined sound may be presented, in which the networked devices are sorted from closest to furthest away. The installer or user may be prompted to indicate that the networked device at the top of the list is to be linked to the first mounting position. In line with what has been described above, the networked device at the top of the list may be instructed to emit a confirmation sound, such that the person with the portable device may hear that it is the intended networked device that has been identified. The person with the portable device may then indicate that this confirmation has been performed. After this, the server may link the unique identifier of the networked device at the top of the list to the first mounting position.

If two or more networked devices have been ranked from closest to furthest away, once the closest one has been linked to the first mounting position, the server may automatically or through installer input continue linking the next networked device on the list to another mounting position that is known to be close to the first position. For this, the next networked device may be instructed to emit a confirmation sound, such that the person with the portable device may confirm that it is correct that the next networked device is in fact the second closest one.

Even if only one networked device detects the predetermined sound, that networked device may be instructed to emit a confirmation sound such that the person with the portable device may ascertain that the intended networked device has been identified. This may be useful, e.g., for avoiding linking the wrong networked device to the first mounting position in case the intended networked device is faulty or blocked, and does not detect the predetermined sound, but another networked device slightly further away does detect the predetermined sound.

It may be advantageous that the networked devices do not listen for the predetermined sound all the time, but only when they have been put into an installation or configuration mode. The server may send an instruction to the networked devices to enter the installation mode and to thereby start listening for the predetermined sound. The networked devices may then exit the installation mode after a predetermined installation time has elapsed or upon an exit instruction from the server. If the portable device has a network connection to the networked devices, the portable device may send an instruction over the network to one or more of the networked devices to start listening for the predetermined sound. If such an instruction is sent from the portable device to only one of the networked devices, that networked device may in turn inform the server and the server may instruct the other networked devices to start listening. In other embodiments, the networked devices may listen continuously for the predetermined sound.

The information specifying the first mounting location may be sent in various ways. As an example, the portable device may be provided by the server with a map of where the networked devices are mounted. When the person holding the portable device has walked up to one of the networked devices, they may indicate this position on the map. This indication may then be sent to the server. In other embodiments, the portable device may be less sophisticated and the person holding it may be instructed where to go based on a map on the server. Such a map could for instance be printed out or the person with the portable device could be verbally instructed by someone viewing the map on the server. When the portable device has been taken to the desired position, the person holding the portable device may activate the predetermined sound. When the server receives information from the networked device that the networked device has detected the predetermined sound, the server may link the unique identifier of the networked device to the mounting position that the person was instructed to go to. The person may continue to another networked device after a predetermined time has passed, after instruction from someone at the server, or after the networked device has emitted a sound indicating that the linking has been completed.

A person skilled in the art realizes that the present invention is not limited to the embodiments described above. On the contrary, many modifications and variations are possible within the scope of the appended claims. Such modifications and variations can be understood and effected by a skilled person in practicing the claimed invention, from a study of the drawings, the disclosure, and the appended claims.

The invention claimed is:

1. A method for identifying which networked device of a set of networked devices is mounted at a first mounting location of mounting locations of the set of networked devices known in a management server, wherein each networked device has a unique identifier, the method comprising:
  emitting a predetermined sound using a loudspeaker of a portable device, wherein the portable device is located at a location that is closer to the first mounting location than to all other mounting locations of the set of network devices such that detection is enabled of the emitted predetermined sound by a microphone in a networked device mounted at the first mounting location;
  sending information specifying the first mounting location from the portable device to the management server;
  upon detecting the predetermined sound using a microphone in a first networked device, sending the unique identifier of the first networked device from the first networked device to the management server; and
  linking, at the management server, the unique identifier of the first networked device to the first mounting location.

2. The method of claim 1, further comprising:
  upon detecting the predetermined sound, the first networked device emitting a predetermined response sound using a loudspeaker in the first networked device.

3. The method of claim 1, wherein the predetermined sound comprises a first frequency and a second frequency and wherein the portable device, when the predetermined sound is emitted, is located at a location that is closer to the first mounting location than to all other mounting locations of the set of networked devices, further comprising:
  obtaining, at the management server, a first ratio between the amplitude at the first frequency and the amplitude at the second frequency of the detected predetermined sound in the first networked device;
  upon detecting the predetermined sound using a microphone in a second networked device, sending the unique identifier of the second networked device from the second networked device to the management server;
  obtaining, at the management server, a second ratio between the amplitude at the first frequency and the amplitude at the second frequency of the detected predetermined sound in the second networked device;
  determining, at the management server, which networked device of the first networked device and the second networked device that is closest to the portable device based on the first ratio and the second ratio; and
  wherein the act of linking comprises
    linking the unique identifier of the networked device determined to be closest to the portable device to the first mounting location.

4. The method of claim 3, further comprising:
  determining, at the first networked device, the first ratio between the amplitude at the first frequency and the amplitude at the second frequency of the detected predetermined sound in the first networked device;
  sending the first ratio from the first networked device to the management server;
  determining, at the second networked device, the second ratio between the amplitude at the first frequency and the amplitude at the second frequency of the detected predetermined sound in the second networked device; and
  sending the second ratio from the second networked device to the management server,
  wherein the act of obtaining, at the management server, the first ratio comprises
    receiving the first ratio, and the act of obtaining, at the management server, the second ratio comprises receiving the second ratio.

5. The method of claim 3, further comprising:
  sending a representation of the detected predetermined sound from the first networked device to the management server; and
  sending a representation of the detected predetermined sound from the second networked device to the management server,
  wherein the act of obtaining, at the management server, the first ratio comprises determining, in the management server, the first ratio between the amplitude at the first frequency and the amplitude at the second frequency of the detected predetermined sound in the first networked device, and
  the act of obtaining, at the management server, the second ratio comprises determining, in the management server, the second ratio between the amplitude at the first frequency and the amplitude at the second frequency of the detected predetermined sound in the second networked device.

6. A system for identifying which networked device of a set of networked devices is mounted at a respective mounting location of mounting locations:
  a portable device comprising a loudspeaker;
  a management server comprising a memory storing the mounting locations of the set of networked devices; and
  the set of networked devices mounted at the mounting locations, each networked device comprising a microphone,
  wherein the portable device further comprises circuitry configured to execute:
    a sound emitting function configured to emit a predetermined sound using the loudspeaker of the portable device, wherein the portable device is located at a location that is closer to the first mounting location than to all other mounting locations of the set of network devices such that detection is enabled of the emitted predetermined sound by a microphone in a networked device mounted at the first mounting location; and
    an information sending function configured to send information specifying a mounting location to the management server,
  wherein each networked device of the set of networked devices further comprises circuitry configured to execute:

an identifier sending function configured to, upon detecting the predetermined sound using the microphone, sending its unique identifier to the management server, and wherein the management server further comprises circuitry configured to execute:
a linking function configured to link the unique identifier to the mounting location.

7. The system of claim 6, wherein the circuitry comprised in each networked device of the set of networked devices is further configured to a sound emitting function configured to, upon detecting the predetermined sound, emit a predetermined response sound using a loudspeaker in the networked device.

8. The system of claim 6, wherein the predetermined sound comprises a first frequency and a second frequency and wherein the portable device, when the predetermined sound is emitted, is located at a location that is closer to the mounting location than to all other mounting locations of the set of networked devices, wherein the circuitry comprised in the management server is further configured to execute:
a ratio obtaining function configured to obtain a respective ratio between the amplitude at the first frequency and the amplitude at the second frequency of the detected predetermined sound in each networked device, and
a closeness determining function configured to determine which networked device of the networked devices that is closest to the portable device based on the respective determined ratios, and
wherein the linking function is configured to link the unique identifier of the networked device determined to be closest to the portable device to the mounting location.

9. The system of claim 8, wherein the circuitry comprising each networked device of the set of networked devices is further configured to execute:
a ratio determining function configured to, upon detecting the predetermined sound, determine the respective ratio between the amplitude at the first frequency and the amplitude at the second frequency of the detected predetermined sound in that networked device; and
a ratio sending function configured to send the respective determined ratio to the management server, and
wherein the ratio obtaining function is configured to receive the respective ratio.

10. The system of claim 8, wherein the circuitry comprised in each networked device of the set of networked devices is further configured to execute:
a sound sending function configured to, upon detecting the predetermined sound, send a representation of the detected predetermined sound to the management server, and
wherein the ratio obtaining function is configured to determine the respective ratio between the amplitude at the first frequency and the amplitude at the second frequency of the detected predetermined sound in each networked device.

11. A non-transitory computer-readable storage medium having stored thereon instructions for implementing a method for identifying which networked device of a set of networked devices is mounted at a first mounting location of mounting locations of the set of networked devices known in a management server, wherein each networked device of the set of networked devices has a unique identifier, the method comprising:
emitting a predetermined sound using a loudspeaker of a portable device, wherein the portable device is located at a location that is closer to the first mounting location than to all other mounting locations of the set of network devices such that detection is enabled of the emitted predetermined sound by a microphone in a networked device mounted at the first mounting location;
sending information specifying the first mounting location from the portable device to the management server;
upon detecting the predetermined sound using a microphone in a first networked device, sending the unique identifier of the first networked device from the first networked device to the management server; and
linking, at the management server, the unique identifier of the first networked device to the first mounting location.

* * * * *